Jan. 29, 1946.                R. N. FRERES                2,393,896
           AUTOCOLLIMATING BUTTON AND LIGHT SHIELD THEREFOR
                       Filed Feb. 5, 1944

Inventor
Robert N. Freres
By *(signature)*
       Attorneys

Patented Jan. 29, 1946

2,393,896

UNITED STATES PATENT OFFICE 2,393,896

AUTOCOLLIMATING BUTTON AND LIGHT SHIELD THEREFOR

Robert N. Freres, Rochester, N. Y., assignor to the United States of America, as represented by the Secretary of War Application February 5, 1944, Serial No. 521,293

6 Claims. (Cl. 250—71)

This invention relates to buttons and more particularly, it is directed to autocollimating buttons adapted to translate invisible light into visible light.

One of the properties which autocollimating buttons must have is complete absorption of all light rays, which would normally hit the phosphor or other light generating surface and be reflected in a diffused state directly therefrom. This property is attained by placing a direct light ray shield at the focal point of a parabolic reflector, which shield has associated, or may have integral therewith, a phosphor back which faces the parabolic reflector. Hence, none but light reflected from the back is returned by the button.

In the application of Neil O. Broderson, Serial No. 521,292 filed February 5, 1944, there is disclosed an autocollimating button including two lens elements having a recess in one of the elements, with light sensitive material in the recess and a plug mounted in the recess for sealing the light sensitive material therein, said plug having black lacquer thereon serving as a direct ray shield shutting off from a front view the light generating material. The two lens elements are frictionally welded together by means of an apparatus disclosed in the application of Louis Gertzog, Serial No. 474,761, filed February 4, 1943. The plug having the black lacquer thereon is provided in the recess for preventing dispersing of the light generating material, due to the violence in the welded friction contact zone of the two lens elements, which contact zone is in general coincidence with the point of application of the light generating material.

It has been discovered that a light ray shield in the form of a piece of flexible material such as black cardboard or other suitable paper may be substituted for the plug having the black lacquer thereon as in the above-mentioned application to Broderson, which improved shield prevents the dispersion of light sensitive material during the welding of the lens elements and is not welded to the lens elements as the plug above referred to.

It is therefore an object of the invention to provide an improved light ray shield in an autocollimating button of the type in which two lens elements are frictionally welded together and having a recess in one of the lens elements, with light generating material in the recess, said improved light ray shield being in the form of a piece of black flexible material such as cardboard fitted into the recess for preventing the dispersion of the light sensitive material during the welding of the lens element together.

Another object of the invention is to provide an improved light ray shield fitted into a recess in one of dual lens elements of an autocollimating button, and having light generating material coated on the shield.

With the above and other objects and advantages in view, the invention consists of certain features of construction and operation of parts, which will hereinafter be described and shown in the accompanying drawing, in which.

Figure 1:
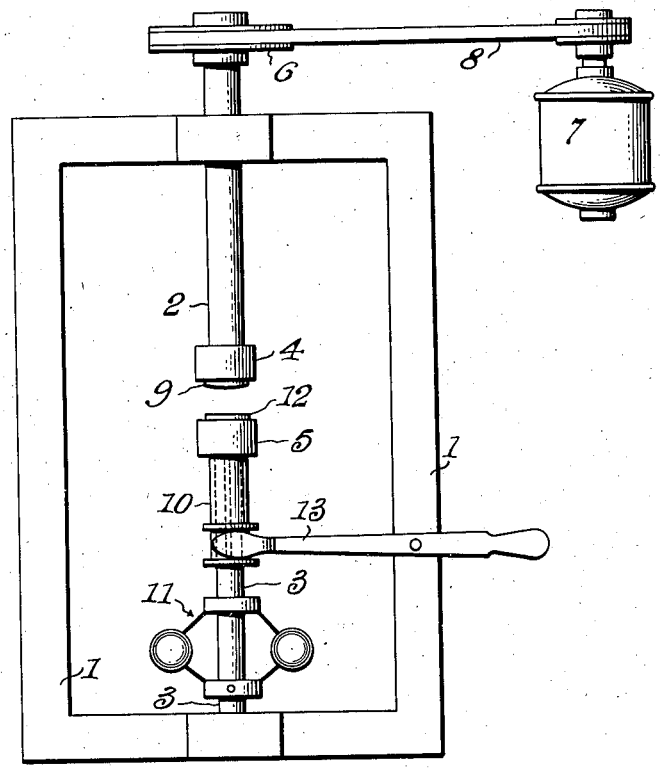
Figure 1 is a top plan view of a machine having two chucks rotatably mounted thereon with dual parts of an autocollimating button to be welded together mounted in the chucks.

Referring more specifically to the drawing, there is shown in Figure 1 a frame 1 having a driven shaft 2 and revoluble shaft 3 mounted thereon. The driven shaft 2 has a chuck 4 mounted on its inner end and a pulley 6 mounted on its outer end, which pulley 6 is driven at a suitable constant speed for rotating the driven shaft 2 by a motor 7 through a belt 8. The chuck 4 on the inner end of shaft 2 holds a portion or lens element 9 of the improved autocollimating button indicated generally by A in Figures 2 and 3, and the revoluble shaft 3 is provided with a sleeve 10 and a brake 11, here illustrated as being of the flyball governor type inertia brake, but any suitable type of braking means may be employed. A chuck 5 is mounted on the inner end of the sleeve 10 in opposed relation to the chuck 4 on the driven shaft 2 and holds a portion or lens element 12 of the button. The sleeve 10 is slidably mounted on the revoluble shaft 3 and is actuated on the shaft 3 by means of a pivoted lever 13 for moving the lens element 12 of the button into and out of frictional contact with the revolved lens element 9.

Figure 2:
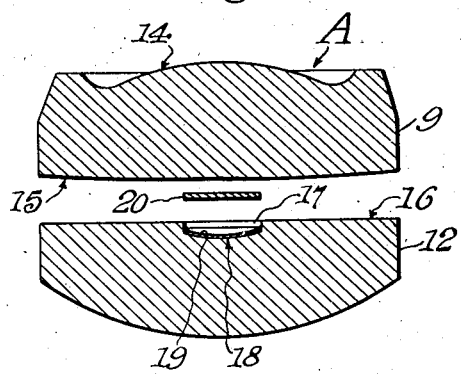
Figure 2 is an enlarged vertical sectional view of the dual parts of the button, showing a recess containing light generating material in one of the parts of the button and having the improved light ray shield fitted into the recess for sealing the light generating material in the recess prior to welding the dual parts of the button together.

The button portions or lens elements 9 and 12 held in chucks 4 and 5, respectively, are more particularly illustrated in Figure 2. The upper driven button portion 9 includes an autocollimating optical outer surface 14 and an inner surface 15 to be welded to the inner surface 16 of button portion 12. The inner surface 15 of button portion 9 is slightly convex to compensate for differential velocity in the welding process as the outer part of the convex surface 15 away from the center of rotation moves considerably faster than the part near the center. A recess or socket 17 is centrally formed in the flat surface 16 of the undriven bottom portion 12, with the inner surface or bottom 18 of the recess 17 being curved and covered with phosphorescent or other light generating material 19.

The improved light ray shield 20 to which this invention is particularly directed is made of any suitable dark, flexible material such as paper, here illustrated as being in the form of a black cardboard disc member which is snugly fitted into the recess 17 formed in the bottom portion or lens element 12 of the button A, whereby the light generating material 19 is sealed in the recess 17 and the possibility of the light generating material becoming distorted during the process of welding the button portions or members 9 and 12 together is avoided. The black cardboard disc 20 serves as a direct light ray shield at the focal point of the button A, shutting off from a front view the light generating material 19.

Figure 3:
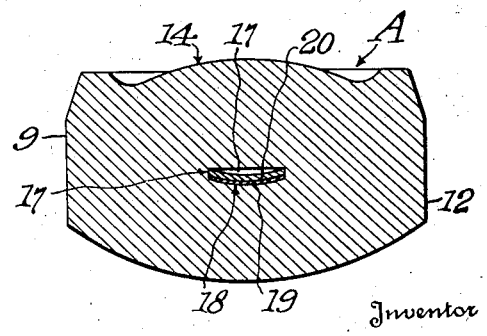
Figure 3 is an enlarged view of a completed button after the dual parts of the button have been welded together and embodying the improved light ray shield therein.
Figure 4:
Figure 4 is an enlarged perspective detail view of the improved light ray shield having light generating material coated thereon.

The improved light ray shield 20 may be directly coated on its back with the light generating material 19 as illustrated in Figure 4 and mounted in the recess 17 of the bottom button member 12, instead of the light generating material 19 being first provided in the recess 17, with the shield 20 placed over the light generating material as shown in Figures 2 and 3.

In forming the improved autocollimating button A, Figures 2 and 3, after the light generating material 19 has been placed in the bottom button member 12 and the light ray shield 20 has been fitted into the recess over the light generating material 19, or the light shield 20 having the light generating material 19 coated on its back, Figure 4, is fitted into the recess 17, the button member 12 is mounted on the chuck 5 and the upper button member 9 is mounted on chuck 4, with the surfaces 15 and 16 of members 9 and 12, respectively, being in opposed relation to each other. Upon starting the motor 7, the driven shaft 2 is rotated at any suitable constant high speed through the belt 8 and pulley 6, thereby rotating chuck 4 holding the button portion 9. The lever 13 is then operated by the hand to move the sleeve 10 inwardly, whereby the inner surface 16 of the non-driven button member 12 in chuck 5 is caused to engage the inner surface 15 of button member 9, thus setting up friction between surfaces 15 and 16 of the button members 9 and 12, respectively, with the production of heat, causing the melting of these surfaces 15 and 16, thus effecting the cementing or welding of the button members 9 and 12 together.

The light ray shield 20 prevents the light generating material 19 in the recess 17 from spreading all over the surface 16 of button portion 12 upon the button portion 9 being brought into contact with non-rotating button portion 12. As the light ray shield 20 fits exactly into the recess 17, it will be temporarily held therein by friction of its outer edge against the surface of the portion of the button member 12 surrounding the recess. The light ray shield 20 is fitted into the recess 17 in such a manner as to be beneath the upper surface 16 of button member 12 and is not welded to the button as the plug in the autocollimating button disclosed in the above-mentioned application of Broderson, said shield being sufficiently flexible to a degree that will permit it to be fitted into the recess 17.

The autocollimating buttons contemplated by this invention are susceptible of a number of uses. For example, markers for roads or paths through mined combat areas. The particular advantage is that a phosphorescent or fluorescent light generating material may be located at the focal point of the parabolic reflecting element of the lens body and a concentrated beam of parallel rays of visible light produced either by the phosphorescent material alone or by a fluorescent material activated by invisible rays such as infra red rays projected from any direction upon the autocollimating surface of the lens body. In this manner a marking device is provided which need not be exposed to visible light to produce a concentrated beam of light and, therefore, will escape detection by occupants of aircraft and other persons not in the line of the concentrated beam.

It will thus be seen that there is herein provided an autocollimating button embodying a new and efficient form of light ray shield thereon and adapted to translate invisible light into visible light. Even though there has herein been shown and described certain features of construction and operation of parts, it is nevertheless to be understood that various changes may be made therein, if the changes do not depart from the spirit or scope of the claims.

Having thus described my invention, what I claim as new and wish to secure by Letters Patent is:

1. An autocollimating button comprising a pair of lens members bonded together, one of said members being provided with an autocollimating outer surface, a recess formed in one of said members, a light generating substance positioned in said recess, and a light shield positioned in said recess in juxtaposition with said light generating substance and between said substance and said autocollimating surface.

2. An autocollimating button comprising a pair of lens members bonded together, one of said members being provided with an autocollimating outer surface, a recess formed in one of said members, a light ray shield mounted in said recess, the face of said shield adjacent said autocollimating surface being provided with a light absorbing surface and the opposite face of said shield being provided with a light generating surface.

3. An autocollimating button in accordance with claim 2 and characterized in that the light ray shield comprises a flexible disc.

4. An autocollimating button in accordance with claim 2 and characterized in that the light ray shield comprises a black cardboard disc provided with a coating of light generating material on one face thereof.

5. An autocollimating button comprising a pair of lens members bonded together, one of said lens members being provided with an autocollimating outer surface, a recess formed in one of said members, light generating material positioned in said recess and guard means positioned between said light generating material and said autocollimating surface for protecting said light generating material.

6. An autocollimating button in accordance with claim 5 characterized in that the guard means comprises a flexible light absorbing disc.

ROBERT N. FRERES.